US010891445B2

(12) United States Patent
Starks et al.

(10) Patent No.: US 10,891,445 B2
(45) Date of Patent: Jan. 12, 2021

(54) USING DECAY CHARACTERISTICS FOR NATURAL LANGUAGE UNDERSTANDING OUTPUT

(71) Applicant: INTERNATIONAL BUSINESS MACHINES CORPORATION, Armonk, NY (US)

(72) Inventors: Kimberly Greene Starks, Nashvile, TN (US); Mauro Marzorati, Lutz, FL (US); Aaron K. Baughman, Cary, NC (US); Craig M. Trim, Ventura, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 134 days.

(21) Appl. No.: 16/289,092

(22) Filed: Feb. 28, 2019

(65) Prior Publication Data

US 2020/0279023 A1    Sep. 3, 2020

(51) Int. Cl.
  *G06F 40/56* (2020.01)
  *G06N 20/00* (2019.01)
  *G06Q 30/02* (2012.01)
  *G06F 40/30* (2020.01)

(52) U.S. Cl.
  CPC .............. *G06F 40/56* (2020.01); *G06F 40/30* (2020.01); *G06N 20/00* (2019.01); *G06Q 30/0226* (2013.01)

(58) Field of Classification Search
  CPC ..................... G06F 40/56; G06Q 30/0226

USPC ............................................. 704/9
  See application file for complete search history.

(56) References Cited

U.S. PATENT DOCUMENTS

| | | | | |
|---|---|---|---|---|
| 7,424,617 B2 * | 9/2008 | Boyd | ..... | G06Q 30/02 463/16 |
| 7,461,022 B1 * | 12/2008 | Churchill | ..... | G06Q 10/02 705/26.3 |
| 7,630,986 B1 * | 12/2009 | Herz | ..... | G06Q 10/10 |
| 7,647,257 B2 * | 1/2010 | Allen | ..... | G06Q 40/12 705/30 |
| 8,595,209 B1 * | 11/2013 | Kraybill | ..... | G06Q 30/0631 707/708 |
| 9,361,365 B2 * | 6/2016 | Sweeney | ..... | G06F 16/367 |

(Continued)

*Primary Examiner* — Susan I McFadden
(74) *Attorney, Agent, or Firm* — James R. Nock, Esq.; Wayne F. Reinke, Esq.; Heslin Rothenberg Farley & Mesiti P.C.

(57) ABSTRACT

Managing usage of a points-based loyalty program includes: receiving, by a data processing system, terms and conditions of a points-based loyalty program of a user; applying, by the system, Natural Language Understanding (NLU) to the terms and conditions, resulting in NLU output, the NLU output including decay characteristic(s) and half-life(lives) for the program; and assisting the user, by the data processing system, in managing usage by the user of the program, based on the decay characteristic(s) and the half-life(lives). The assisting includes monitoring, by the system, aspect(s) of the program for potential use(s) of the set of points by the user based, at least in part, on the half-life; and alerting, by the system, the user as to the potential use(s). The managing further includes determining a decay value for a set of points received by the user based on the one or more decay characteristic and the half-life(lives).

20 Claims, 6 Drawing Sheets

(56) References Cited

U.S. PATENT DOCUMENTS

| | | | |
|---|---|---|---|
| 10,331,673 B2* | 6/2019 | Adderly | G06F 16/24575 |
| 10,360,219 B2* | 7/2019 | Adderly | G06F 16/2477 |
| 10,532,268 B2* | 1/2020 | Tran | A63B 69/36 |
| 10,593,129 B2* | 3/2020 | Bruce | G07B 15/02 |
| 10,672,008 B2* | 6/2020 | Braff | G06Q 40/00 |
| 2014/0129357 A1 | 5/2014 | Goodwin | |
| 2014/0136309 A1 | 5/2014 | Goldman et al. | |
| 2015/0012425 A1 | 1/2015 | Mathew | |
| 2016/0012465 A1* | 1/2016 | Sharp | G06Q 20/384 |
| | | | 705/14.17 |
| 2016/0071140 A1 | 3/2016 | Sherman | |
| 2018/0137532 A1 | 5/2018 | Boyd et al. | |

* cited by examiner

USING DECAY CHARACTERISTICS FOR NATURAL LANGUAGE UNDERSTANDING OUTPUT

BACKGROUND

Loyalty programs are abundant. There are point-based loyalty systems, pure life-style loyalty programs, tier-based affinity and community-based programs, coalition and hybrid-loyalty programs. In 2017, according to one report, 70% of shoppers said they belonged to as many as five non-grocery loyalty programs. This metric included 74% of all adults in the US at that time. The loyalty market is estimated to be worth over $100 billion in the US market alone. Of this amount, it is estimated that $16 billion is lost each year.

Given the vast number of loyalty programs, the complexity of the terms and conditions, and the challenge in managing the programs from both a corporate and a consumer side, this number represents lost opportunity. Opportunity loss on the corporate front includes higher churn rates and less brand retention. Consumers who are not aware of specific terms and conditions or other facets of a particular loyalty program may find that they have lost a coveted tiered status. Another report notes that 78% of consumers are retracting loyalty at a faster pace than the previous three years.

SUMMARY

Shortcomings of the prior art are overcome and additional advantages are provided through the provision, in one aspect, of a computer-implemented method of managing usage of a points-based loyalty program. The method includes: receiving, by a data processing system, a plurality of terms and conditions of a points-based loyalty program of a user; applying, by the data processing system, Natural Language Understanding (NLU) to the plurality of terms and conditions, resulting in NLU output, wherein the NLU output comprises one or more decay characteristic and at least one half-life for the points-based loyalty program; assisting the user, by the data processing system, in managing usage by the user of the points-based loyalty program, based on the one or more decay characteristic and the at least one half-life, wherein the assisting comprises: monitoring, by the data processing system, one or more aspect of the points-based loyalty program for one or more potential use of the set of points by the user based, at least in part, on the half-life; alerting, by the data processing system, the user as to the one or more potential use; and determining a decay value for a set of points received by the user based on the one or more decay characteristic and the at least one half-life.

In another aspect, a system for managing usage of a points-based loyalty program may be provided. The system may include, for example, memory(ies), at least one processor in communication with the memory(ies). The memory(ies) include program instructions executable by the one or more processor to perform a method. The method may include, for example: receiving, by a data processing system, a plurality of terms and conditions of a points-based loyalty program of a user; applying, by the data processing system, Natural Language Understanding (NLU) to the plurality of terms and conditions, resulting in NLU output, wherein the NLU output comprises one or more decay characteristic and at least one half-life for the points-based loyalty program; assisting the user, by the data processing system, in managing usage by the user of the points-based loyalty program, based on the one or more decay characteristic and the at least one half-life, wherein the assisting comprises: monitoring, by the data processing system, one or more aspect of the points-based loyalty program for one or more potential use of the set of points by the user based, at least in part, on the half-life; alerting, by the data processing system, the user as to the one or more potential use; and determining a decay value for a set of points received by the user based on the one or more decay characteristic and the at least one half-life.

In a further aspect, a computer program product may be provided. The computer program product may include a storage medium readable by a processor and storing instructions executable by the processor for performing a method. The method may include, for example: receiving, by a data processing system, a plurality of terms and conditions of a points-based loyalty program of a user; applying, by the data processing system, Natural Language Understanding (NLU) to the plurality of terms and conditions, resulting in NLU output, wherein the NLU output comprises one or more decay characteristic and at least one half-life for the points-based loyalty program; assisting the user, by the data processing system, in managing usage by the user of the points-based loyalty program, based on the one or more decay characteristic and the at least one half-life, wherein the assisting comprises: monitoring, by the data processing system, one or more aspect of the points-based loyalty program for one or more potential use of the set of points by the user based, at least in part, on the half-life; alerting, by the data processing system, the user as to the one or more potential use; and determining a decay value for a set of points received by the user based on the one or more decay characteristic and the at least one half-life.

Further, services relating to one or more aspects are also described and may be claimed herein.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
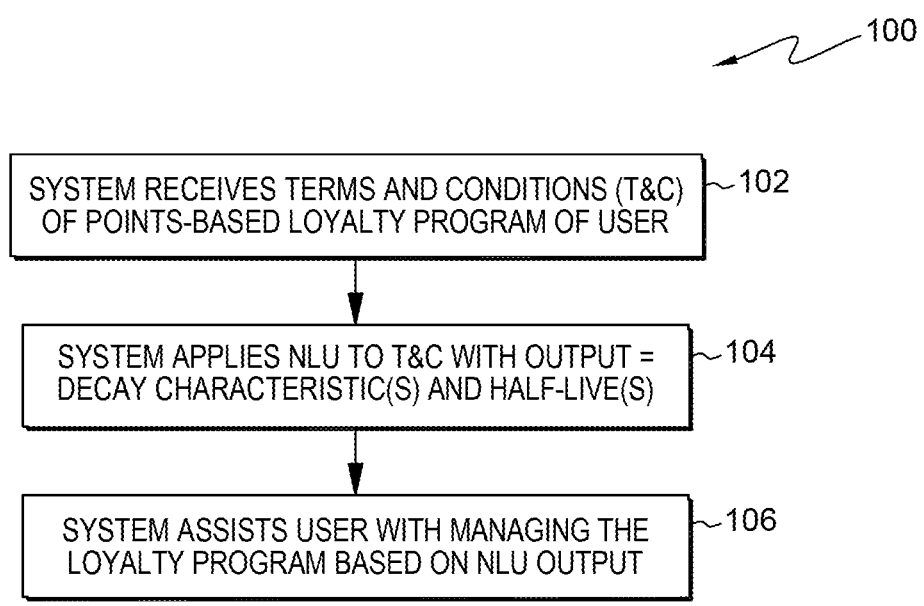
FIG. 1 is a flow diagram for one example of a computer-implemented method of managing usage of a points-based loyalty program by a user, in accordance with one or more aspects of the present disclosure.

One or more aspects of this disclosure relate, in general, to loyalty programs. More particularly, one or more aspects of this disclosure relate to managing use of a points-based loyalty program by users.

Disclosed herein, in accordance with one or more aspects of the present disclosure, is managing usage of a points-based loyalty program. A computer-implemented method of managing usage of a points-based loyalty program, the computer-implemented method including: receiving, by a data processing system, a plurality of terms and conditions of a points-based loyalty program of a user; applying, by the data processing system, Natural Language Understanding (NLU) to the plurality of terms and conditions, resulting in NLU output, wherein the NLU output comprises one or more decay characteristic and at least one half-life for the points-based loyalty program; and assisting the user, by the data processing system, in managing usage by the user of the points-based loyalty program, based on the decay characteristic(s) and the half-life(lives). The half-life can be used to determine a decay value for a set of points using a decay formula. Behavior modification of users may include altering input(s) for determining the decay value in order to encourage modifying one or more behavior of the user regarding use of the points-based loyalty program.

As used herein, the term "points-based loyalty program" refers to a program that awards points to a user based on purchases of the user from participating organizations (e.g., merchants). For example, where the loyalty program is directed to dining at restaurants, in whole or in part, the points may be good toward dining at participating restaurants. As another example, airline loyalty programs award points (or miles) for flying on the airline, the points good toward future reduced or no-cost air travel.

As used herein, the term "trade-in" when used with respect to a points-based loyalty program refers to an option in such a program allowing a user to return (to merchant, for example) or trade a reserved upcoming service or ordered/reserved goods to another user or the loyalty program in exchange for points, either from the other user or from the program, respectively.

Approximating language that may be used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" or "over" the other elements or features. Thus, the example term "below" may encompass both an orientation of above and below. The device may be otherwise oriented (e.g., rotated 90 degrees or at other orientations) and the spatially relative descriptors used herein should be interpreted accordingly. When the phrase "at least one of" is applied to a list, it is being applied to the entire list, and not to the individual members of the list.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

FIG. 1 is a flow diagram 100 for one example of a computer-implemented method of managing usage of a points-based loyalty program by a user, in accordance with one or more aspect of the present disclosure. The method begins with the data processing system receiving 102 terms and conditions of points-based loyalty program of the user, applying 104 NLU to terms and conditions with the output including decay characteristic(s) and half-life(lives), and assisting 106 the user with managing the loyalty program based on the NLU output. The shorter the half-life, the more points will be needed. The system may, for example, alert the user of potential use(s). In one embodiment, the system may alert the user if a condition in a points-based loyalty program requires action on the part of the user. For example, where a loyalty program includes a number of tiered user statuses and monitoring reveals a reduction in status or imminent reduction in status, the system would alert the user in case the user can take steps to remedy the situation. In another embodiment, as the system learns patterns of a user in terms of actions taken in response to an alert, the system may take action on behalf of the user with confirmation of the action(s) taken communicated to the user or preapproved by the user.

Loyalty program data, which may also include receipts, statements (e.g., bank statements, loyalty program statements and credit card statements), calendars, email addresses, etc., and extracted half-lives may be stored, for example, in a database to build a history of the receipt and use of points by a user. There may also be additional information regarding a user that is saved to the database. For example, such additional information can include direct user feedback (e.g., in response to a user survey). As another example, there may be information regarding a user from merchants participating in the points-based loyalty program, for example, user ratings based on things like not showing up at a reserved day and time (e.g., restaurants) and returning purchased goods an inordinate number of times. Such stored data may also or instead be used for machine learning. The loyalty program may, from time to time, issue special offers, for example, a reduced number of points for using a service or buying a gift card for a participating merchant. Special/limited time offers may be associated with a decay formula, or instead of a half-life, such a special offer may have an expiration date, which can be thought of as an extreme for a half-life.

Figure 2:
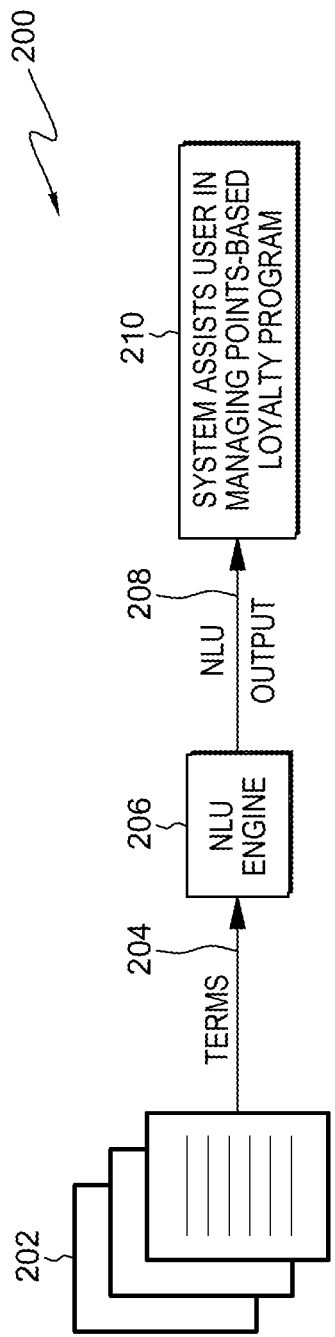
FIG. 2 is a combination block/flow diagram for an embodiment of the computer-implemented method of FIG. 1, in accordance with one or more aspects of the present disclosure.

FIG. 2 is a combination block/flow diagram 200 for an embodiment of the computer-implemented method of FIG. 1, in accordance with one or more aspects of the present disclosure. The terms and conditions 203 of the points-based loyalty program 202, which includes an initial half-life for each program-applicable event, good and/or service, are input 204 into a Natural Language Understanding (NLU) Engine 206 to better understand the terms. The extracted output 208 of the NLU Engine includes, for example, decay characteristic(s) and one or more half-life, as well as things like identifying terms of key importance and any relationships between them. For example, important terms or conditions may express actions that can or cannot be done, relationships between terms, terms that apply only under certain condition(s), exceptions to a term applying, etc. The system then uses the NLU output to assist 210 the user in managing the user's usage of the points-based loyalty program. In one embodiment, the system may periodically or in response to a trigger (e.g., updated terms based on alerts from the loyalty program), rerun the process of FIG. 2, for example, to capture changes to the terms and conditions of the loyalty program.

Figure 3:
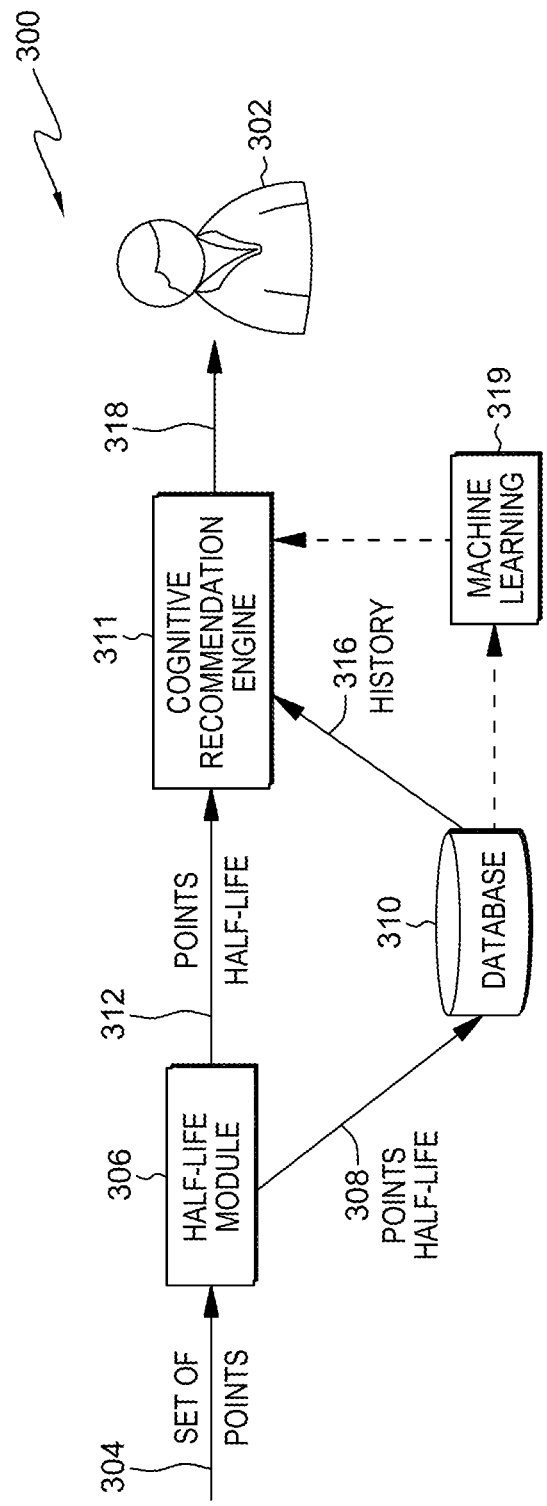
FIG. 3 is a combination flow/block diagram for determining potential point usage opportunities for a user using a cognitive recommendation engine, in accordance with one or more aspects of the present disclosure.

FIG. 3 is a combination flow/block diagram 300 for giving cognitive recommendations to a user 302 regarding points usage, in accordance with one or more aspects of the present disclosure. A set of points 304 received by the user are input into a half-life module 306, which assigns a most current half-life to the set of points. As subsequently discussed, a half-life may change over time from that extracted via NLU. Each set of points has associated decay characteristic(s), for example, an initial quantity of points, the half-life of the relevant event/good/service and the amount of time that has passed. While users are executing points for an event, for example, the system changes the half-life value of the event, based on how long the event is taking current and/or recent users. This may also change the value of points relative to current and future events. The half-life and set of points may be stored 308 in a historical database 310 for the user. The points and half-life are sent 312 to a cognitive recommendation engine 311 for analysis of potential use(s) for the set of points and may also analyze a points balance and the half-lives of constituent sets of points for the user, in order to better identify point usage opportunities. Further, the cognitive recommendation engine may import part or all of a usage history 316 for use in the cognitive analysis. Any potential uses found are sent 316 to the user for consideration. Using the history, machine learning 319 may be performed.

Cognitive recommendation engine 311 in FIG. 3 takes as input loyalty program data including, for example, a user's history regarding points usage, user purchase receipts and statements (e.g., bank statements, loyalty program statements, credit card statements, etc.). The output of the cognitive recommendation engine is one or more strategy for optimizing points usage for the user. In some respects, formulating a point spending strategy is somewhat similar to devising investment strategies. However, formulating a point spending strategy is more complex, as it takes into account user preferences (e.g., what is and is not of value to the user with respect to the loyalty program), as well as other factors, such as the extracted half-life and decay characteristic(s), as well as a decay value. For example, to formulate an optimum points spending strategy, additional factors may include user spending patterns/behaviors, calendar entries (e.g., conflicts with already planned travel), email, etc. In one example, a user may wonder whether using points or cash is best for travel outside the United States, for example, travel to Europe. Aside from the airline ticket to fly to Europe, there are substantial related costs, for example, travel taxes and destination airport fees. Thus, to travel to Europe using only points would be relatively expensive in terms of points. In comparison, domestic travel does not include such additional costs. Due to this difference, the system may formulate a point spending strategy for travel that includes using points for domestic travel and cash for travel outside the United States. The output could be triggered by newly awarded points or other trigger, automatically on a periodic basis and/or in response to a user request for a recommendation. In addition, in one embodiment, the system may periodically review results from the cognitive recommendation engine to determine if the process of creating it should be rerun and/or whether just one or more change to the existing engine is needed.

In one embodiment, a half-life may change over time, based on behavior patterns of a user with respect to points usage. For example, if a user shows a pattern of eating breakfast quickly on Mondays. As a result, the half-life will decrease over time. As another example, if a user shows a pattern of eating breakfast quickly on one or more days of the week, the half-life will decrease over time. As still another example, if a user shows a pattern of enjoying an event and savoring every moment, the prolonged time will increase the half-life over time.

In one example, assume a user decides to use a set of 100 points to make a dinner reservation in two days (or 48 hours) at a moderately in-demand restaurant with a demand value (e.g., scale between 0 and 1) of 0.5. Note, the scale of demand is arbitrary; it could be any scale. A half-life of 15 days (or 360 hours) is assigned to the set of points at ingest into the system, based on an extracted half-life from the terms and conditions. Thus, in one example, using the decay value equation previously discussed: $N(t)=100 \times 0.5^y$, where $$y = \frac{t}{HF} = \frac{48}{360} = 0.13,$$

results in a decay value of 91.38. The decay and half-life are indicative of the coefficient, slope, exponent, etc., part of the function of unit time that results in (the dependent variable) points required to secure the reservation at said time (the independent variable).

For the same example, the new decay value for trading in the reservation (i.e., "sell" it to another user in exchange for points) may be: $N_{new}$=[(abs value (91.38–100))×0.5)]+100=104.31 points paid to the user for the reservation. Now, assume the demand value were 0.9 (highly in demand), then $N_{new}$=107.76 and if the demand value were 0.1 (low demand) $N_{new}$=100.86.

For contrast, in another example, assume the user books the same reservation, but for 30 days (or 720 hours) out, and $$y = \frac{720}{360} = 2,$$

which results in a decay value of: $N(t)=100 \times 0.5^2=25$. Further, the trade-in value would be 137.5 for a demand value of 0.5, 167.5 for a demand value of 0.9 and 107.5 for a demand value of 0.1.

In one embodiment, a merchant (e.g., a restaurant owner) participating in a points-based loyalty program wants to discourage a short time between arranging an activity provided by the merchant, for example, the time between making a dinner reservation with a restaurant and the dinner reservation day/time. Coupled with discouraging short times, the merchant also seeks to encourage longer times between activity arrangement and the day/time of the actual activity. Variables in the applicable decay formula can be manipulated to achieve the desired results, for example, using the decay formula $N(t)=N_0 \times 0.5^y$, where y=time/half-life, for example, one way to accomplish the twin goals, all other variables remaining the same, is to reduce the half-life of points, where the terms and conditions allow, resulting in a higher point cost to the user.

Certain embodiments herein may offer various technical computing advantages involving computing advantages to address problems arising in the realm of computer networks. Particularly, computer networks operating to manage usage of a points-based loyalty program. Embodiments herein can include assigning a half-life to a set of point(s) received by a user, based on an extracted half-life from the terms and conditions, using, for example, NLU. Embodiments herein can include determining a decay value for points received by a user, the decay value based, in part, on the assigned half-life. Embodiments herein can include system monitoring of a points-based loyalty program for a user to alert the user to potential use(s) of the loyalty program by the user, as well as alerting the user to issues needing the attention of the user. Embodiments herein can include using behavior modification to encourage/discourage one or more behaviors of a user with regard to points usage in a loyalty program. Various decision data structures can be used to drive artificial intelligence (AI) decision making, such as decision data structure that cognitively analyze the terms of a points-based loyalty program in order to advise a user as to points usage opportunities tailored to the user and/or attention needed by the user. Embodiments herein can use Natural Language Understanding to better understand the terms of a points-based loyalty program. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

As noted above, loyalty program terms may be processed using Natural Language Understanding. The umbrella term "Natural Language Understanding" can be applied to a diverse set of computer applications, ranging from small, relatively simple tasks such as, for example, short commands issued to robots, to highly complex endeavors such as, for example, the full comprehension of newspaper articles or poetry passages. Many real world applications fall between the two extremes, for example, text classification for the automatic analysis of emails and their routing to a suitable department in a corporation does not require in-depth understanding of the text, but it does need to work with a much larger vocabulary and more diverse syntax than the management of simple queries to database tables with fixed schemata.

Regardless of the approach used, most natural language understanding systems share some common components. The system needs a lexicon of the language and a parser and grammar rules to break sentences into an internal representation. The construction of a rich lexicon with a suitable ontology requires significant effort, for example, some lexicons required many person-years of effort. Such lexicons are large lexical databases of English. Nouns, verbs, adjectives and adverbs are grouped into sets of cognitive synonyms (synsets), each expressing a distinct concept. Synsets are interlinked by means of conceptual-semantic and lexical relations. The resulting network of meaningfully related words and concepts can be navigated, for example, with a browser specially configured to provide the navigation functionality. The structure of lexicons makes them a useful tool for computational linguistics and natural language processing.

In one example, a lexicon may resemble a thesaurus, in that it groups words together based on their meanings. However, there are some important distinctions. First, some lexicons interlink not just word forms—strings of letters—but specific senses of words. As a result, words that are found in close proximity to one another in the network are semantically disambiguated. Second, some lexicons label the semantic relations among words, whereas the groupings of words in a thesaurus does not follow any explicit pattern other than meaning similarity.

The system also needs a semantic theory to guide the comprehension. The interpretation capabilities of a language understanding system depend on the semantic theory it uses. Competing semantic theories of language have specific trade-offs in their suitability as the basis of computer-automated semantic interpretation. These range from naive semantics or stochastic semantic analysis to the use of pragmatics to derive meaning from context.

Advanced applications of natural language understanding also attempt to incorporate logical inference within their framework. This is generally achieved by mapping the derived meaning into a set of assertions in predicate logic, then using logical deduction to arrive at conclusions. Therefore, systems based on functional languages such as the Lisp programming language need to include a subsystem to represent logical assertions, while logic-oriented systems such as those using the language Prolog, also a programming language, generally rely on an extension of the built-in logical representation framework.

A Natural Language Classifier, which could be a service, for example, applies cognitive computing techniques to return best matching predefined classes for short text inputs, such as a sentence or phrase. It has the ability to classify phrases that are expressed in natural language into categories. Natural Language Classifiers ("NLCs") are based on Natural Language Understanding (NLU) technology (previously known as "Natural Language Processing"). NLU is a field of computer science, artificial intelligence (AI) and computational linguistics concerned with the interactions between computers and human (natural) languages.

Using, for example, a natural language classifier service via an application programming interface (API), one can send loyalty program terms to a natural language classifier trained using machine learning techniques. The classifier will return its prediction of a class that best captures what is expressed in the terms. Based on the predicted class one can trigger an application to take the appropriate action such as providing an answer to a question, suggest a relevant product based on expressed interest or forward the text to an appropriate human expert who can help.

In one example, a cognitive computer system provides a cognitive recommendation to a user. In general, the term "cognitive computing" (CC) has been used to refer to new hardware and/or software that mimics the functioning of the human brain and helps to improve human decision-making, which can be further improved using machine learning. In this sense, CC is a new type of computing with the goal of more accurate models of how the human brain/mind senses, reasons, and responds to stimulus. CC applications link data analysis and adaptive page displays (AUI) to adjust content for a particular type of audience. As such, CC hardware and applications strive to be more effective and more influential by design.

Some common features that cognitive systems may express include, for example: ADAPTIVE—they may learn as information changes, and as goals and requirements evolve. They may resolve ambiguity and tolerate unpredictability. They may be engineered to feed on dynamic data in real time, or near real time; INTERACTIVE—they may interact easily with users so that those users can define their needs comfortably. They may also interact with other processors, devices, and Cloud services, as well as with people; ITERATIVE AND STATEFUL—they may aid in defining a problem by asking questions or finding additional source input if a problem statement is ambiguous or incomplete. They may "remember" previous interactions in a process and return information that is suitable for the specific application at that point in time; and CONTEXTUAL—they may understand, identify, and extract contextual elements such as meaning, syntax, time, location, appropriate domain, regulations, user's profile, process, task and goal. They may draw on multiple sources of information, including both structured and unstructured digital information, as well as sensory inputs (e.g., visual, gestural, auditory and/or sensor-provided).

Figure 4:
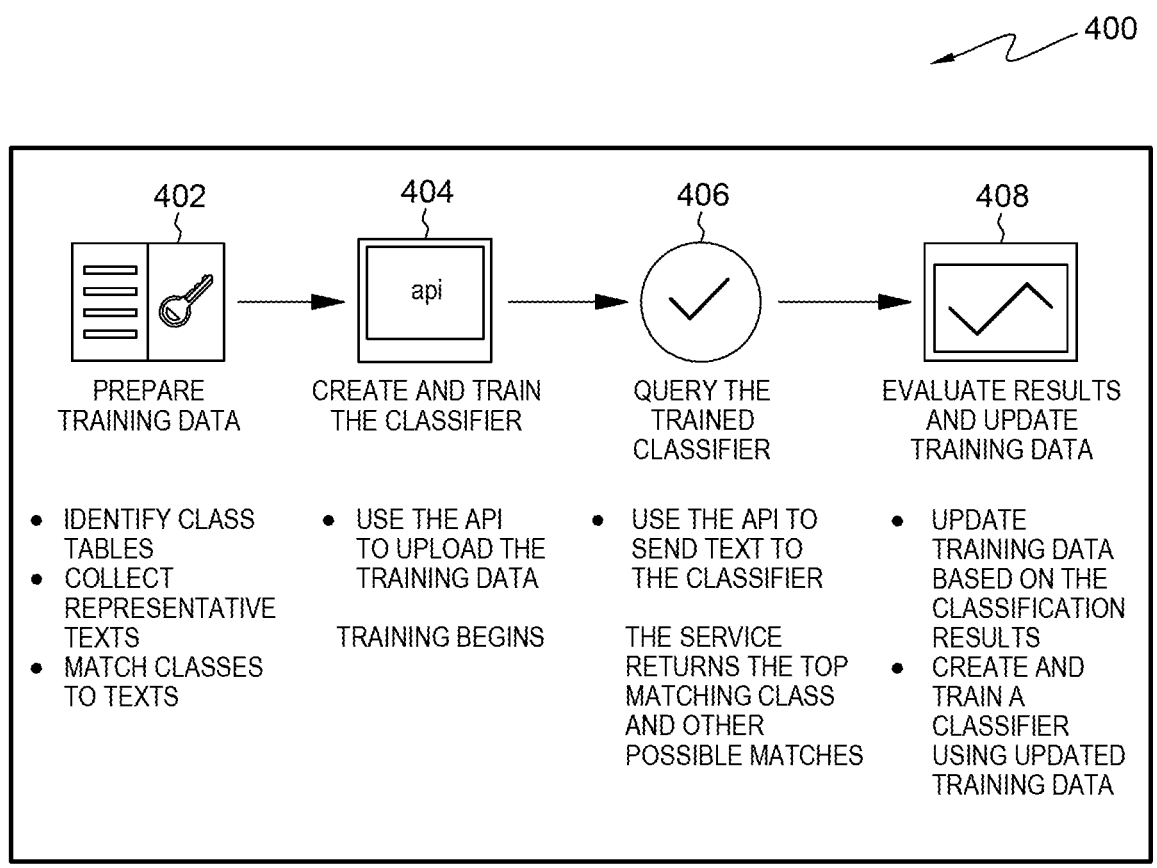
FIG. 4 is a hybrid flow diagram of one example of an overview of the basic steps for creating and using a natural language classifier service, in accordance with one or more aspects of the present disclosure.

FIG. 4 is a hybrid flow diagram 400 of one example of an overview of the basic steps for creating and using a natural language classifier service. Initially, training data for machine learning is prepared, 402, by identifying class tables, collecting representative texts and matching the classes to the representative texts. An API (Application Planning Interface) may then be used to create and train the classifier 404 by, for example, using the API to upload training data. Training may begin at this point. After training, queries can be made to the trained natural language classifier, 406. For example, the API may be used to send text to the classifier. The classifier service then returns the matching class, along with other possible matches. The results may then be evaluated and the training data updated, 408, for example, by updating the training data based on the classification results. Another classifier can then be trained using the updated training data.

Various decision data structures can be used to drive artificial intelligence (AI) decision making, such as decision data structure that cognitively analyzes loyalty program terms. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms.

In addition, providing cognitive recommendations from the cognitive recommendation engine may include searching cross co-occurrence matrices in making the cognitive recommendations. Based, at least in part, on user behaviors and the program terms, a subsequent behavior of the user may be predicted. The prediction may be made employing a predictive model trained using machine learning. The cognitive recommendations correspond to possible points use opportunity may be provided to the user based, at least in part, on the predicted behavior of the user and the possible points use opportunity. The cognitive recommendations may be continually or periodically updated. The monitoring, predicting and providing the cognitive recommendations are performed by a processor, in communication with a memory storing instructions for the processor to carry out the monitoring, predicting and providing of cognitive recommendations to the user.

For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio or other signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

As used herein, a term in the form of "cognitively <function>" refers to the use of cognitive computing in performing the function. Cognitive computing is the simulation of human thinking, using software and/or hardware, which may be enhanced/improved using machine learning. Machine learning is based in mathematics and statistical techniques, giving computer systems the ability to "learn" with data provided, e.g., a relatively large amount of data, without the need to be explicitly programmed. The goal of cognitive computing is to create automated systems capable of solving problems without human assistance, broadly referred to as Artificial Intelligence (AI).

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

Where used herein, the term "real-time" refers to a period of time necessary for data processing and presentation to a user to take place, and which is fast enough that a user does not perceive any significant delay. Thus, "real-time" is from the perspective of the user.

The cognitive recommendation to the user can be presented, for example, through a display-based network-connected device, e.g., a smart mirror, a tablet, smartphone, computer, kiosk, hologram, augmented reality, virtual reality, etc. The network may include, for example, a global communications network (e.g., the Internet). The display-based connected device may be, for example, interactive with users. The recommendation to the user may be, for example, in the form of a push message (with or without an image or video component) or updated website or app interaction. Periodically, the real-time user behaviors may then be used to retrain the system and create a new cross co-occurrence (CCO) model and matrices to drive the recommendations using existing software.

In one example, a simple co-occurrence algorithm may be described using an equation:

$$r=[A^tA]h_a$$

where "r" is a recommendation; "ha" is a user's history of some primary action (e.g., a purchase or points-use history); "A" is a history of all users' primary actions and, in one example, matrix "AtA" compares column to column using, for example, a log-likelihood based correlation test. In addition, all information known about a user (e.g., in-venue behaviors) can be used to find correlations between different behaviors, known as a cross-occurrence, information such as, for example, purchase behavior, view behavior, category-preference, location-preference, device-preference, etc. For example, the basic equation can be expanded for different behaviors:

$$r=[A^tA]h_a+[A^tB]h_b+[A^tC]h_c$$

where ha-hc are user histories of different primary actions or behaviors.

In one embodiment, a system to facilitate a computer-implemented method of managing usage of a points-based loyalty program, including making cognitive recommendations, can include at a high level, for example, a front end, a back end, a backbone and a search engine. A "front end" in this context refers to an intake module for user behavior and related data. In one example, the front end can be a distributed linear algebra framework and mathematically expressive domain specific language. It serves as a scalable machine-learning library. A "back end" in this context refers to a cluster-computing framework; it is a general purpose "big data" processing engine. Some common uses of such a back end include, for example, interactive queries across large data sets and machine learning. A "backbone" in this context refers to software for use with big data analytics. A "search engine" in this context refers to a large-scale enterprise search platform. In one example, several variables may be input into one or more cross co-occurrence matrices and used to do a search (i.e., a cross co-occurrence query) for similar information for other users. The results of the search may then be used to formulate a recommendation.

The system may be trained using machine learning and user behavior (historical) data. As the historical database grows, machine learning can be periodically repeated to further train (or retrain) the system and create new cross co-occurrence model and matrices to drive recommendations, for example, using existing software.

The system can run various processes including, for example, a preparation and maintenance process, Natural Language Understanding (NLU) process (previously, "Natural Language Processing"), a predicting process, a notifying process and a machine learning process.

The system can store various data, for example, historical user data as described herein, or decision data structures for use in providing artificial intelligence (AI) decisions, for example, cognitive recommendations as to loyalty program usage to users.

The predicting process may employ, for example, a predictive model trained using machine learning to predict subsequent user behaviors based, at least in part, on the half-life of points and behavior patterns of the user.

The system running the notifying process can send notifications to users. The notifications can include, for example, a text based notification, e.g., email, voice or other visual, based, at least in part, on the output of the predicting process.

In one example, the system runs a machine learning process that can update one or more process run by the system based on obtained data to improve and accuracy and/or reliability of the one or more process. In one embodiment, the system may, for example, use a decision data structure that predicts, in accordance with the predicting process, subsequent behaviors.

The system in one embodiment can run a plurality of instances of such a decision data structure, each instance for a different user. For each instance of the decision data structure, the system can make user predictions and usage recommendations. The system running the machine learning process can continually or periodically update the different instances of the decision data structure.

The system can run the preparation and maintenance process to populate and maintain data of data repository for use by various processes run by the system including, for example, the predicting process.

The system can run the NLU process to process data for preparation of records that are stored in the data repository and for other purposes. The system can run a Natural Language Understanding (NLU) process for determining one or more NLU output parameter of a message. The NLU process can include one or more of a topic classification process that determines topics of messages and output one or more topic NLU output parameter, a sentiment analysis process which determines sentiment parameter for a message, e.g. polar sentiment NLU output parameters, "negative," "positive," and/or non-polar NLU output sentiment parameters, e.g. "anger," "disgust," "fear," "joy," and/or "sadness" or other classification process for output of one or more other NLU output parameters e.g. one of more "social tendency" NLU output parameter or one or more "writing style" NLU output parameter.

By running the NLU process, the system can perform a number of processes including one or more of (a) topic classification and output of one or more topic NLU output parameter for a received message (b) sentiment classification and output of one or more sentiment NLU output parameter for a received message or (c) other NLU classifications and output of one or more other NLU output parameter for the received message.

Topic analysis for topic classification and output of NLU output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLU parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader).

In one example, sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

In a first aspect, disclosed above is a computer-implemented method of managing usage of a points-based loyalty program. The computer-implemented method includes: receiving, by a data processing system, terms and conditions of a points-based loyalty program of a user; applying, by the data processing system, Natural Language Understanding (NLU) to the terms and conditions, resulting in NLU output, the NLU output including decay characteristic(s) and half-life(lives) for the points-based loyalty program; assisting the user, by the data processing system, in managing usage by the user of the points-based loyalty program, based on the decay characteristic(s) and the half-life(lives), the assisting including: monitoring, by the data processing system, aspect(s) of the points-based loyalty program for potential use(s) of the set of points by the user based, at least in part, on the half-life; alerting, by the data processing system, the user as to the more potential use(s); and determining a decay value for a set of points received by the user based on the decay characteristic(s) and the half-life(lives).

In one example, the determining may include, for example, using a decay formula.

In one example, the decay value in the computer-implemented method of the first aspect may, for example, be determined according to $N(t)=No\times(0.5^y)$, wherein $y=t/Hf$, wherein $N(t)$ is the decay value, No is a number of points in the set of points, t is a time between one or more action to arrange for an activity using one or more point of the set of points and when the activity actually takes place. In a further example, a demand metric may be assigned to the activity according to $N_{new}=abs(N(t)-No)\times D+No$, and wherein $N_{new}$ is a new decay value for the set of points in a trade-in and wherein D is a value indicative of demand for the activity.

In one example, the computer-implemented method of the first aspect may further include, for example, altering input(s) for determining the decay value in order to encourage modifying behavior(s) of the user regarding use of the points-based loyalty program.

In one example, the computer-implemented method of the first aspect may further include, for example, reconciling, by the data processing system, loyalty program statement(s) with receipt(s) for transaction(s) of the user.

In one example, the computer-implemented method of the first aspect may further include, for example: storing points received and points used by the user under the points-based loyalty program in a database; and applying machine learning to the points received and the points used.

In one example, the assisting in the computer-implemented method of the first aspect may include, for example, cognitively recommending to the user, by the data processing system, at least one use of point(s) of the user.

In a second aspect, disclosed above is a system for managing usage of a points-based loyalty program. The system includes: a memory; and at least one processor in communication with the memory, the memory storing program code executable by the at least one processor to perform a method. The method includes: receiving, by a data processing system, terms and conditions of a points-based loyalty program of a user; applying, by the data processing system, Natural Language Understanding (NLU) to the terms and conditions, resulting in NLU output, the NLU output including decay characteristic(s) and half-life(lives) for the points-based loyalty program; assisting the user, by the data processing system, in managing usage by the user of the points-based loyalty program, based on the decay characteristic(s) and the half-life(lives), the assisting including: monitoring, by the data processing system, aspect(s) of the points-based loyalty program for potential use(s) of the set of points by the user based, at least in part, on the half-life; alerting, by the data processing system, the user as to the more potential use(s); and determining a decay value for a set of points received by the user based on the decay characteristic(s) and the half-life(lives).

In one example, the determining may include, for example, using a decay formula.

In one example, the system of the second aspect may further include, for example, altering input(s) for determining the decay value in order to encourage modifying behavior(s) of the user regarding use of the points-based loyalty program.

In one example, the assisting in the system of the second aspect may include, for example, cognitively recommending to the user, by the data processing system, use(s) of point(s) of the user.

In one example, the decay value in the system of the second aspect may, for example, be determined according to $N(t)=No\times(0.5^y)$, wherein $y=t/Hf$, wherein $N(t)$ is the decay value, No is a number of points in the set of points, t is a time between one or more action to arrange for an activity using one or more point of the set of points and when the activity actually takes place. In a further example, a demand metric may be assigned to the activity according to $N_{new}=abs(N(t)-No)\times D+No$, and wherein $N_{new}$ is a new decay value for the set of points in a trade-in and wherein D is a value indicative of demand for the activity.

In one example, the system of the second aspect may further include, for example, reconciling, by the data processing system, loyalty program statement(s) with receipt(s) for transaction(s) of the user.

In a third aspect, disclosed above is a computer program product for managing usage of a points-based loyalty program, the computer program product including: a storage medium readable by a processor and storing instructions executable by the processor for performing a method of managing usage of a points-based loyalty program, the method comprising: receiving, by a data processing system, terms and conditions of a points-based loyalty program of a user; applying, by the data processing system, Natural Language Understanding (NLU) to the terms and conditions, resulting in NLU output, the NLU output including decay characteristic(s) and half-life(lives) for the points-based loyalty program; assisting the user, by the data processing system, in managing usage by the user of the points-based loyalty program, based on the decay characteristic(s) and the half-life(lives), the assisting including: monitoring, by the data processing system, aspect(s) of the points-based loyalty program for potential use(s) of the set of points by the user based, at least in part, on the half-life; alerting, by the data processing system, the user as to the more potential use(s); and determining a decay value for a set of points received by the user based on the decay characteristic(s) and the half-life(lives).

In one example, the computer program product may further include, for example, altering input(s) for determining the decay value in order to encourage modifying behavior(s) of the user regarding use of the points-based loyalty program.

In one example, the assisting in the computer program product of the third aspect may include, for example, cognitively recommending to the user, by the data processing system, use(s) of point(s) of the user.

In one example, the decay value in the computer program product of the third aspect may, for example, be determined according to $N(t)=No\times(0.5^y)$, wherein $y=t/Hf$, wherein $N(t)$ is the decay value, No is a number of points in the set of points, t is a time between one or more action to arrange for an activity using one or more point of the set of points and when the activity actually takes place. In a further example, a demand metric may be assigned to the activity according to $N_{new}=abs(N(t)-No)\times D+No$, and wherein $N_{new}$ is a new decay value for the set of points in a trade-in and wherein D is a value indicative of demand for the activity.

In one example, the computer program product of the third aspect may further include, for example, reconciling, by the data processing system, loyalty program statement(s) with receipt(s) for transaction(s) of the user.

Figure 5:
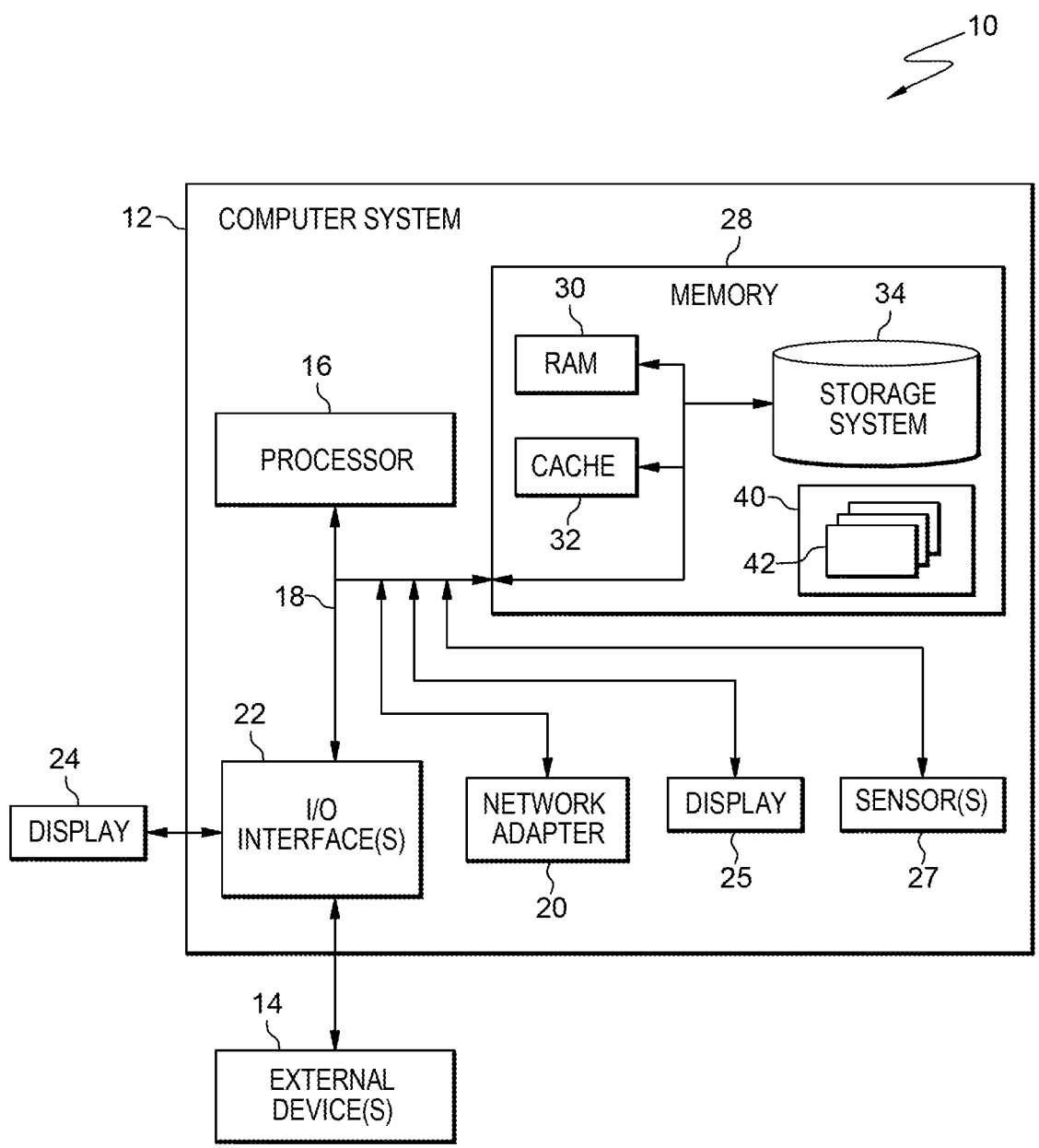
FIG. 5 is a block diagram of one example of a computer system, in accordance with one or more aspects of the present disclosure.
Figure 6:
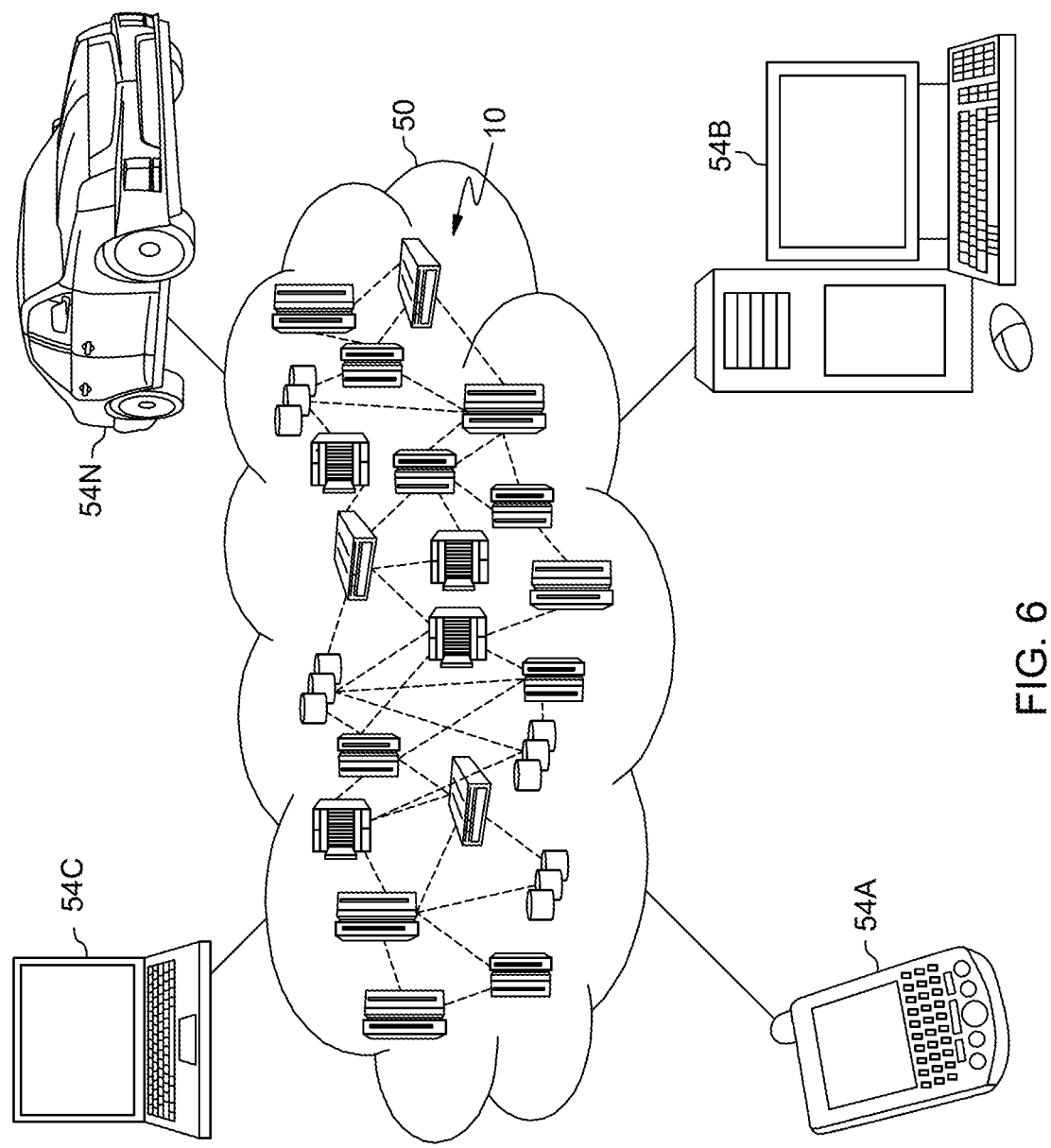
FIG. 6 is a block diagram of one example of a cloud computing environment, in accordance with one or more aspects of the present disclosure.
Figure 7:
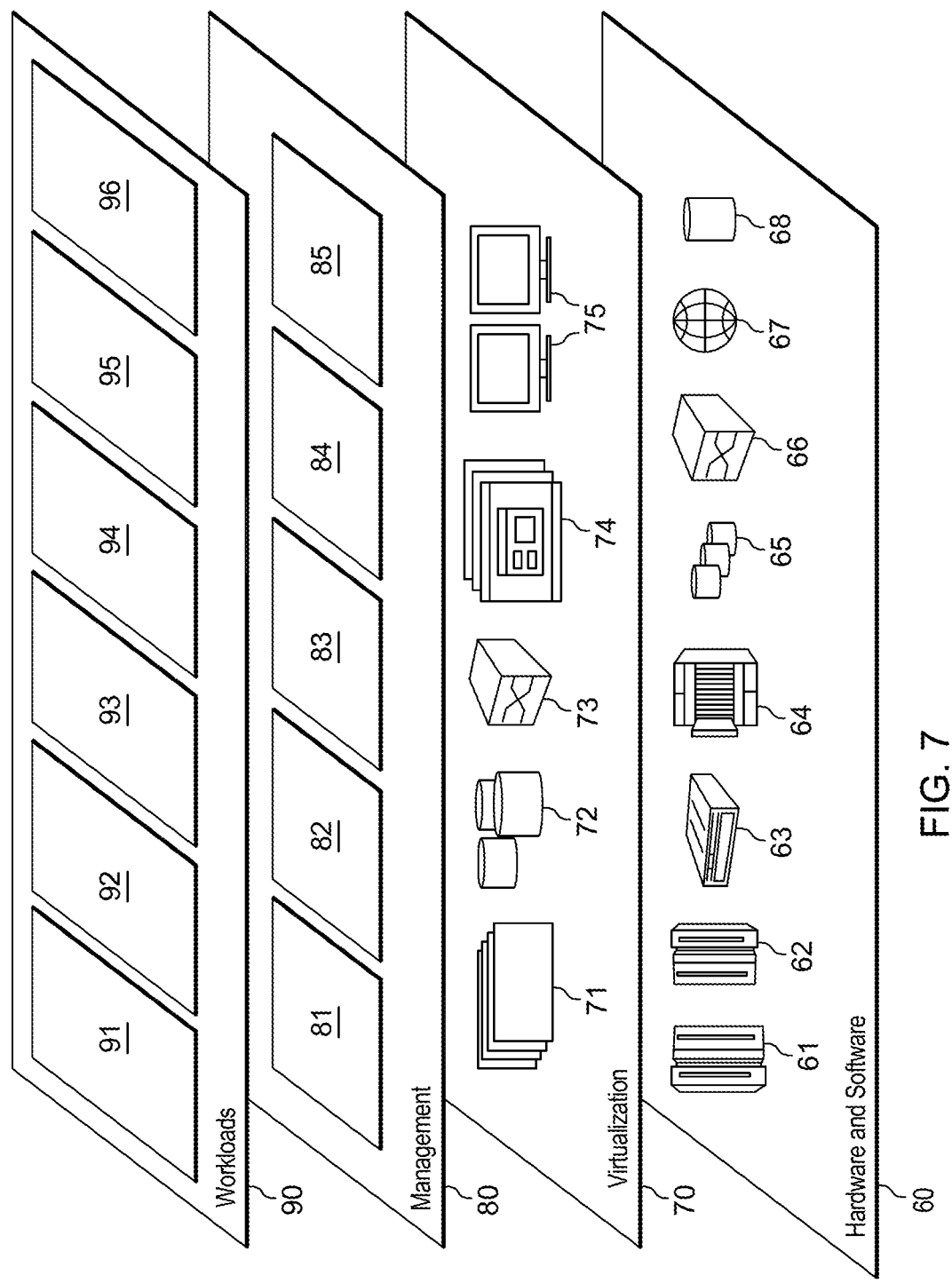
FIG. 7 is a block diagram of one example of functional abstraction layers of the cloud computing environment of FIG. 6, in accordance with one or more aspects of the present disclosure.

FIG. 5-7 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIG. 6-7.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein. In one embodiment, manager system 110 can include one or more computing node 10 and can include one or more program 40 for performing functions described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. Computer system 12 can include one or more network adapter 20. In FIG. 6, computing node 10 is described as being implemented in a cloud computing environment and accordingly is referred to as a cloud computing node in the context of FIG. 6.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for establishing and updating geofence locations as set forth herein. The processing components 96 can be implemented with use of one or more program 40 described in FIG. 5.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method of managing usage of a points-based loyalty program, the computer-implemented method comprising:

receiving, by a data processing system, a plurality of terms and conditions of a points-based loyalty program of a user;

applying, by the data processing system, Natural Language Understanding (NLU) to the plurality of terms and conditions, resulting in NLU output, wherein the NLU output comprises one or more decay characteristic and at least one half-life for the points-based loyalty program;

assisting the user, by the data processing system, in managing usage by the user of the points-based loyalty program, based on the one or more decay characteristic and the at least one half-life, wherein the assisting comprises:

monitoring, by the data processing system, one or more aspect of the points-based loyalty program for one or more potential use of the set of points by the user based, at least in part, on the half-life;

alerting, by the data processing system, the user as to the one or more potential use; and determining a decay value for a set of points received by the user based on the one or more decay characteristic and the at least one half-life.

2. The computer-implemented method of claim 1, wherein the determining comprises using a decay formula.

3. The computer-implemented method of claim 1, wherein the decay value is determined according to $N(t) = No \times (0.5^y)$, wherein $y = t/Hf$ and wherein $N(t)$ is the decay value, No is a number of points in the set of points, t is a time between one or more action to arrange for an activity using one or more point of the set of points and when the activity actually takes place.

4. The computer-implemented method of claim 3, wherein a demand metric is assigned to the activity according to $(N_{new} = abs(N(t) - No) \times D + No)$, wherein $N_{new}$ is a new decay value for the set of points in a trade-in and wherein D is a value indicative of demand for the activity.

5. The computer-implemented method of claim 1, further comprising altering one or more input for determining the decay value in order to encourage modifying one or more behavior of the user regarding use of the points-based loyalty program.

6. The computer-implemented method of claim 1, further comprising reconciling, by the data processing system, one or more loyalty program statement with one or more receipt for one or more transaction of the user.

7. The computer-implemented method of claim 1, further comprising:

storing points received and points used by the user under the points-based loyalty program in a database; and applying machine learning to the points received and the points used.

8. The computer-implemented method of claim 1, wherein the assisting comprises cognitively recommending to the user, by the data processing system, at least one use of one or more point of the user.

9. A system for managing usage of a points-based loyalty program, the system comprising:

a memory; and at least one processor in communication with the memory, the memory storing program code executable by the at least one processor to perform a method, the method comprising:

receiving, by a data processing system, a plurality of terms and conditions of a points-based loyalty program of a user;

applying, by the data processing system, Natural Language Understanding (NLU) to the plurality of terms and conditions, resulting in NLU output, wherein the NLU output comprises one or more decay characteristic and at least one half-life for the points-based loyalty program;

assisting the user, by the data processing system, in managing usage by the user of the points-based loyalty program, based on the one or more decay characteristic and the at least one half-life, wherein the assisting comprises:

monitoring, by the data processing system, one or more aspect of the points-based loyalty program for one or more potential use of the set of points by the user based, at least in part, on the half-life;

alerting, by the data processing system, the user as to the one or more potential use; and determining a decay value for a set of points received by the user based on the one or more decay characteristic and the at least one half-life.

10. The system of claim 9, wherein the determining comprises using a decay formula.

11. The system of claim 9, further comprising altering one or more input for determining the decay value in order to encourage modifying one or more behavior of the user regarding use of the points-based loyalty program.

12. The system of claim 9, wherein the assisting comprises cognitively recommending to the user, by the data processing system, at least one use of one or more point of the user.

13. The system of claim 9, wherein the decay value is determined according to $N(t) = No \times (0.5^y)$, wherein $y = t/Hf$, wherein $N(t)$ is the decay value, No is a number of points in the set of points, t is a time between one or more action to arrange for an activity using one or more point of the set of points and when the activity actually takes place.

14. The system of claim 9, wherein a demand metric is assigned to the activity according to $N_{new} = abs(N(t) - No) \times D + No)$, and wherein $N_{new}$ is a new decay value for the set of points in a trade-in and wherein D is a value indicative of demand for the activity.

15. The system of claim 9, further comprising reconciling, by the data processing system, one or more loyalty program statement with one or more receipt for one or more transaction of the user.

16. A computer program product for managing usage of a points-based loyalty program, the computer program product comprising:

a computer readable storage medium readable by a processor and storing instructions executable by the processor for performing a method of managing usage of a points-based loyalty program, the method comprising:

receiving, by a data processing system, a plurality of terms and conditions of a points-based loyalty program of a user;

applying, by the data processing system, Natural Language Understanding (NLU) to the plurality of terms and conditions, resulting in NLU output, wherein the NLU output comprises one or more decay characteristic and at least one half-life for the points-based loyalty program;

assisting the user, by the data processing system, in managing usage by the user of the points-based loyalty program, based on the one or more decay characteristic and the at least one half-life, wherein the assisting comprises:

monitoring, by the data processing system, one or more aspect of the points-based loyalty program for one or more potential use of the set of points by the user based, at least in part, on the half-life;

alerting, by the data processing system, the user as to the one or more potential use; and determining a decay value for a set of points received by the user based on the one or more decay characteristic and the at least one half-life.

17. The computer program product of claim 16, further comprising altering one or more input for determining the decay value in order to encourage modifying one or more behavior of the user regarding use of the points-based loyalty program.

18. The computer program product of claim 16, wherein the assisting comprises cognitively recommending to the user, by the data processing system, at least one use of one or more point of the user.

19. The computer program product of claim 16, wherein the decay value is determined according to $N(t)=No\times(0.5^y)$, wherein $y=t/Hf$, wherein $N(t)$ is the decay value, No is a number of points in the set of points, t is a time between one or more action to arrange for an activity using one or more point of the set of points and when the activity actually takes place, wherein a demand metric is assigned to the activity according to $(N_{new}=abs(N(t)-No)\times D+No)$, and wherein $N_{new}$ is a new decay value for the set of points in a trade-in and wherein D is a value indicative of demand for the activity.

20. The computer program product of claim 16, further comprising reconciling, by the data processing system, one or more loyalty program statement with one or more receipt for one or more transaction of the user.

\* \* \* \* \*